(12) United States Patent  
Yoshikawa (10) Patent No.: US 8,386,584 B2  
(45) Date of Patent: Feb. 26, 2013

(54) MULTIMEDIA PROCESSING CONTROL APPARATUS AND MULTIMEDIA PROCESSING CONTROL METHOD

(75) Inventor: Hisashi Yoshikawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 405 days.

(21) Appl. No.: 12/844,036

(22) Filed: Jul. 27, 2010

(65) Prior Publication Data

US 2011/0047255 A1 Feb. 24, 2011

(30) Foreign Application Priority Data

Aug. 18, 2009 (JP) ................................ 2009-189248

(51) Int. Cl.  
*G06F 15/16* (2006.01)

(52) U.S. Cl. ........ 709/217; 709/203; 709/205; 709/212; 709/220

(58) Field of Classification Search .................. 709/203, 709/217, 220  
See application file for complete search history.

(56) References Cited

U.S. PATENT DOCUMENTS

| | | | | |
|---|---|---|---|---|
| 5,598,525 A | * | 1/1997 | Nally et al. .................. | 345/546 |
| 2006/0184987 A1 | * | 8/2006 | Allen et al. .................. | 725/100 |
| 2010/0145480 A1 | | 6/2010 | Yoshikawa | |
| 2011/0047255 A1 | * | 2/2011 | Yoshikawa .................... | 709/223 |

FOREIGN PATENT DOCUMENTS

| | | |
|---|---|---|
| JP | 11-338841 | 12/1999 |
| JP | 2001-022713 | 1/2001 |
| JP | 2001-243115 | 9/2001 |
| JP | 2006-023997 | 1/2006 |

OTHER PUBLICATIONS

OpenMax, Integration Layer Application Programming Interface Specificatrion, 2. OpenMax IL Introduction and Architecture, The Khronos Group Inc., Version 1.1.2, 2008, pp. 20-44.  
Japanese Office Action for Japanese Application No. 2009-189248 mailed Oct. 9, 2012.

* cited by examiner

*Primary Examiner* — Michael Won  
(74) *Attorney, Agent, or Firm* — Turocy & Watson, LLP (57) ABSTRACT

A multimedia processing control apparatus according to embodiments has a holding section which holds groups of information for management of a plurality of components generated in a first address space, and a plurality of groups of first address information, and also holds a plurality of groups of second address information in a second address space; a control section request issue section which converts, when a processing request is issued, each of the plurality of groups of second address information into the plurality of groups of first address information by referring to the holding section, and issues the processing request; a processing section request issue section which issues from the first address space the processing request; and a component processing section which controls the plurality of components on the basis of the plurality of groups of first address information the processing request.

20 Claims, 8 Drawing Sheets

TABLE (31)

Component Information (32):

| IDENTIFIER FOR COMPONENT 15 IN NODE 101 | MANAGEMENT INFORMATION AND IDENTIFIER FOR COMPONENT 15 IN NODE 102 |
| IDENTIFIER FOR COMPONENT 16 IN NODE 101 | MANAGEMENT INFORMATION AND IDENTIFIER FOR COMPONENT 16 IN NODE 102 |
| IDENTIFIER FOR COMPONENT 17 IN NODE 101 | MANAGEMENT INFORMATION AND IDENTIFIER FOR COMPONENT 17 IN NODE 102 |

Buffer Meta-Information (33):

| IDENTIFIER FOR BUFFER 24 IN NODE 101 | IDENTIFIER FOR BUFFER 24 IN NODE 102 |

Table 31a:

| | Component Information | | |
|---|---|---|---|
| IDENTIFIER FOR COMPONENT 15 IN NODE 101a | MANAGEMENT INFORMATION AND IDENTIFIER FOR COMPONENT 15 IN NODE 102 | SHARED INFORMATION | REFERENCE ADDRESS INFORMATION |
| IDENTIFIER FOR COMPONENT 16 IN NODE 101a | MANAGEMENT INFORMATION AND IDENTIFIER FOR COMPONENT 16 IN NODE 102 | SHARED INFORMATION | REFERENCE ADDRESS INFORMATION |
| IDENTIFIER FOR COMPONENT 17 IN NODE 101a | MANAGEMENT INFORMATION AND IDENTIFIER FOR COMPONENT 17 IN NODE 102 | SHARED INFORMATION | REFERENCE ADDRESS INFORMATION |

(32a indicates the right portion: SHARED INFORMATION / REFERENCE ADDRESS INFORMATION columns)

Buffer Meta-Information (33a):

| IDENTIFIER FOR BUFFER 24 IN NODE 101a | IDENTIFIER FOR BUFFER 24 IN NODE 102 |
|---|---|

MULTIMEDIA PROCESSING CONTROL APPARATUS AND MULTIMEDIA PROCESSING CONTROL METHOD

CROSS-REFERENCE TO RELATED APPLICATION(S)

This application is based upon and claims the benefit of priority from the prior Japanese Patent Application No. 2009-189248 filed on Aug. 18, 2009; the entire contents of which are incorporated herein by reference.

BACKGROUND

1. Field

Embodiments described herein relate generally to a multimedia processing control apparatus and a multimedia processing control method.

2. Description of the Related Art

In the field of image processing technique for example, a multimedia processing control apparatus has been used in which a plurality of functional blocks are used to realize a desired function. For example, in the OpenMAX standard, each of a plurality of functional blocks realizing recording or playing a moving image is defined as a component. Each of the plurality of components has a port for data communication, and setting of data communication port connections between the components is performed to enable data transfer between the components via the ports.

According to the OpenMAX standard, a client module (hereinafter referred to simply as "client") calls up a specified interface and controls each component. Control of each component includes, for example, generation of a plurality of components for playing a moving image, the above-described port connection setting and issue of requests for data processing to the generated components. A multimedia processing control apparatus can perform processing such as playing a moving image by using a plurality of components as described above. Conventionally, in such a case, a client as a component control section that generates and controls components and the components exist on one chip.

In a case where components and a specified interface are mounted in one chip and a client is to control the components from the outside of the chip, the client cannot refer to information on the components through the specified interface. That is, in a case where a client is in a chip different from a chip containing components, the client cannot control the components.

This is because the address space in which the client exists is different from the address space in which the components and the specified interface exist. Therefore, in a remote system in which a client exists in an address space different from an address space in which components and a specified interface exist, the client cannot generate and control the components.

Also, for example, a system in which a client and components are connected to each other through a communication network has been proposed (see, for example, Japanese Patent Application Laid-Open Publication No. 11-338841). In this proposed system, however, a client designates a node by using an IP address of a component host at which components exist, and the client cannot generate and control components.

BRIEF DESCRIPTION OF THE DRAWINGS

FIG. 8 is a diagram showing an example of a table held and managed by a control section API 12a.

DETAILED DESCRIPTION

According to an embodiment of the present invention, a multimedia processing control apparatus has a holding section, a control section request issue section, a processing section request issue section and a component processing section. The holding section holds groups of information for management of a plurality of components generated in a first address space and each configured to execute predetermined processing, and a plurality of groups of first address information respectively designating the groups of information for management of the plurality of components, and also holds a plurality of groups of second address information respectively corresponding to the plurality of groups of first address information in a second address space in which a component control section configured to control the plurality of components exists. When a processing request is issued from the component control section, the control section request issue section converts each of the plurality of groups of second address information in the second address space designated by the component control section into the plurality of groups of first address information in the first address space by referring to the holding section, and issues the processing request. The processing section request issue section issues from the first address space the processing request from the component control section issued from the control section request issue section. The component processing section controls the plurality of components on the basis of the plurality of groups of first address information in the first address space of the processing request issued from the processing section request issue section.

Embodiments of the present invention will be described below in detail with reference to the drawings.

(First Embodiment)

Figure 1:
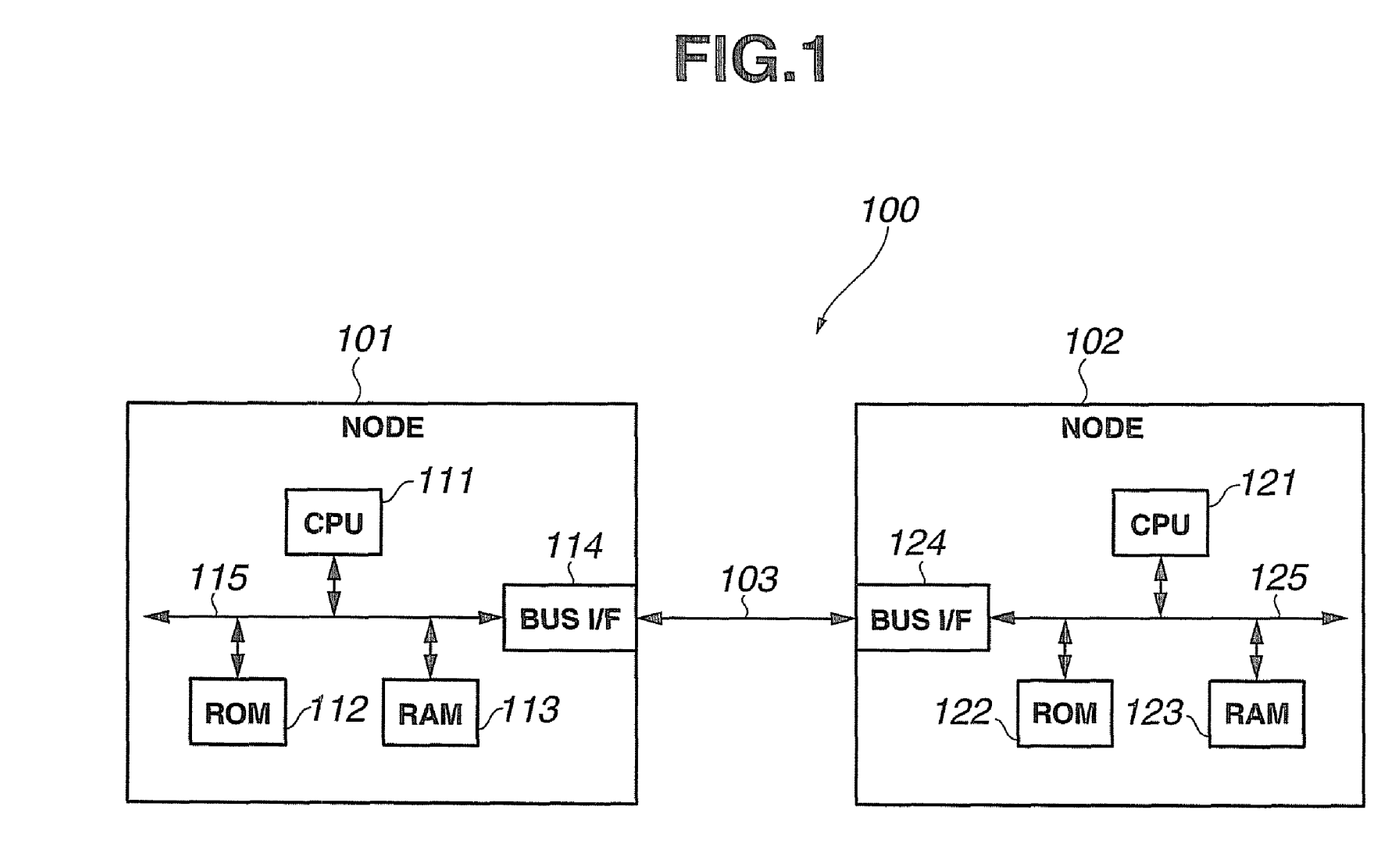
FIG. 1 is a diagram showing the configuration of a multimedia processing control system according to a first embodiment of the present invention.

The configuration of a multimedia processing control system according to a first embodiment of the present invention will be described with reference to FIG. 1. FIG. 1 is a diagram showing the configuration of a multimedia processing control system according to the first embodiment of the present invention.

As shown in FIG. 1, the multimedia processing control system 100 includes a node 101, a node 102 which is a one-chip semiconductor device, and a bus 103. The node 101 and the node 102 are connected to each other by the bus 103. The node 101, the node 102 and the bus 103 are laid on a circuit board (not shown).

The node 101 is, for example, an external CPU, which controls the node 102. The node 101 includes a CPU 111, a ROM 112, a RAM 113, a bus interface (hereinafter referred to as "bus I/F") 114 and a local bus 115. The CPU 111, the ROM 112, the RAM 113 and the bus I/F 114 are connected to each other by the local bus 115.

A component control program and a control section-oriented API are stored in the ROM 112. The CPU 111 reads out these programs from the ROM 112, loads the programs into the RAM 113 and executes the programs. The component control program and the control section-orientated API are executed by the CPU 111 to form a component control section and a control section-oriented API each described below.

On the other hand, the node 102 is configured as one-chip semiconductor device. The node 102 performs, for example, playing or recording of a moving image under the control of the node 101. The node 102 includes a CPU 121, a ROM 122, a RAM 123, a bus I/F 124 and a local bus 125. The CPU 121, the ROM 122, the RAM 123 and the bus I/F 124 are connected to each other by the local bus 125.

A processing section-oriented API, a component processing program and a plurality of component programs are stored in the ROM 122. The CPU 121 reads out these programs from the ROM 122, loads the programs into the RAM 123 and executes the programs. The processing section-oriented API, the component processing program and the plurality of component programs are executed by the CPU 121 to form a processing section-oriented API, a component processing section and a plurality of components each described below.

Each of the component programs is a program to perform a single-function processing, e.g., video decoding processing or filtering processing. By combining such kinds of single-function processing, the desired data processing, e.g., recording or playing a moving image is performed and processing results are displayed on a display device (not shown).

Thus, in the configuration of multimedia processing control system 100, the node 101 and the node 102 are connected to each other by the bus 103. In this configuration, therefore, the address space of the component control program stored in the node 101 and the address space of the component programs stored in the node 102 are different from each other.

The multimedia processing control system 100 is not limited to the above-described configuration in which the node 101 and the node 102 are connected to each other by the bus 103, as long as the address space of the component control program in the node 101 and the address space of the component programs in the node 102 are different from each other. For example, a configuration may be adopted in which each of the nodes 101 and 102 is a personal computer and the personal computers as the nodes 101 and 102 are connected to each other via a network instead of being connected by the bus 103. In this configuration, a component control program and a control section-oriented API are stored in one of the two personal computers, while a processing section-oriented API, a component processing program and a plurality of component programs are stored in the other of the two personal computers.

Figure 2:
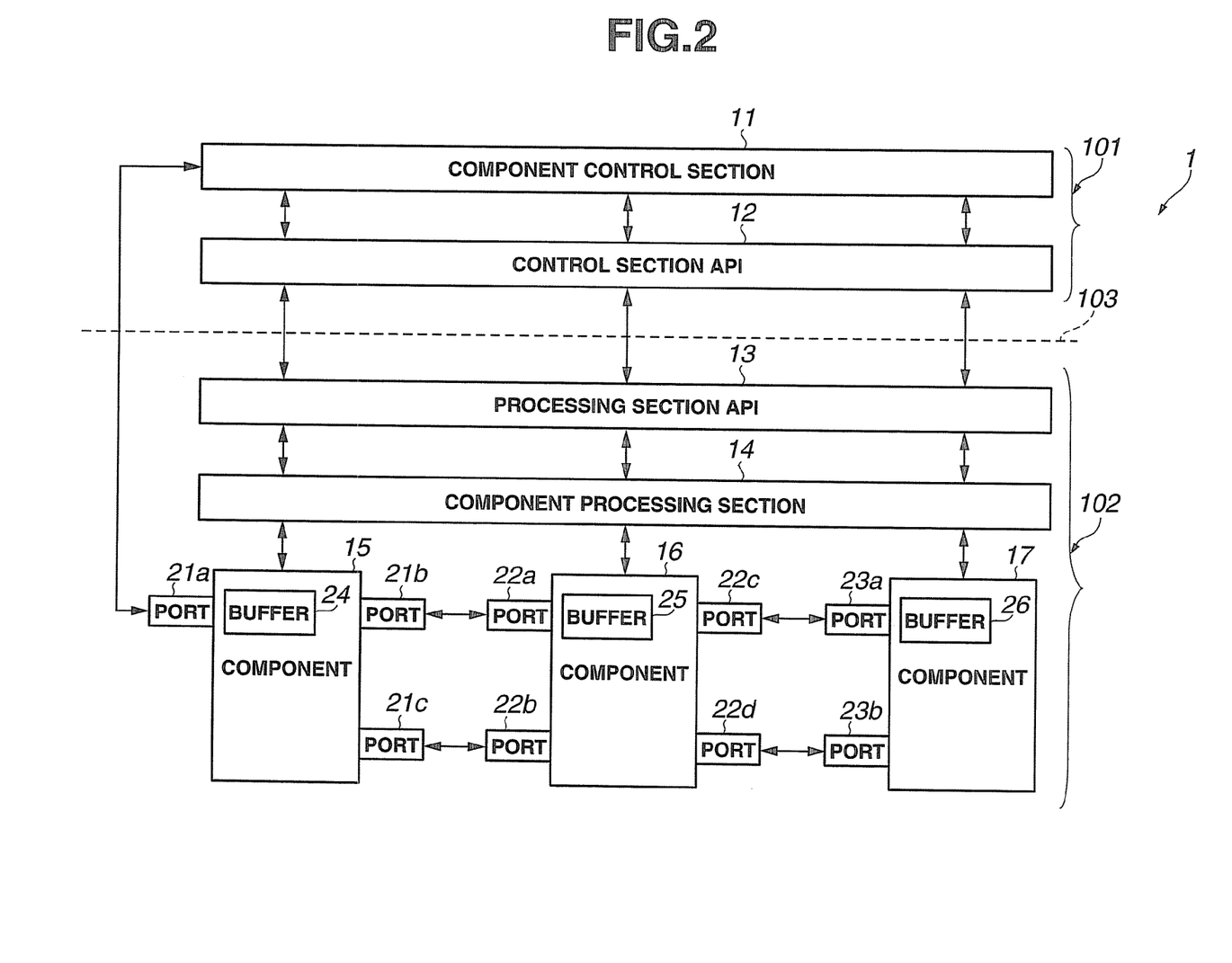
FIG. 2 is a diagram showing the configuration of a multimedia processing control apparatus according to the first embodiment of the present invention.

The component control program and the control section-oriented API are executed on the CPU 111, and the processing section-oriented API, the component processing program and the plurality of component programs are executed on the CPU 121, thus configuring a multimedia processing control apparatus shown in FIG. 2.

The configuration of the multimedia processing control apparatus thus configured will be described. FIG. 2 is a diagram showing the configuration of the multimedia processing control apparatus according to the first embodiment of the present invention.

As shown in FIG. 2, the multimedia processing control apparatus 1 includes a component control section 11, a control section-oriented API (hereinafter referred to as "control section API") 12, a processing section-oriented API (hereinafter referred to as "processing section API") 13, a component processing section 14 and a plurality of components (three components in this description) 15 to 17.

The illustrated state of the multimedia processing control apparatus 1 is a state when processing for playing a moving image is designated. For example, a component 15 is a functional block configured to execute video decoding processing; a component 16 is a functional block configured to execute filtering processing; and a component 17 is a functional block configured to execute processing for output to a screen. The multimedia processing control apparatus 1 plays a moving image by combining these components 15 to 17. The multimedia processing control apparatus 1 may have a plurality of components (not shown) other than the three components 15 to 17. When receiving a command to perform processing for recording of the moving image, for example, the multimedia processing control apparatus 1 performs recording of the moving image by combining these components.

In the illustrated example of the operation, the component control section 11 is operating in the node 101, while the component processing section 14 and the components 15 to 17 are operating in the node 102. The nodes 101 and 102 are connected to each other by the bus 103 as described above and can perform data communication therebetween.

In the node 101 in which the component control section 11 is operating, the control section API 12 that provides an interface for controlling the components 15 to 17 is operating. In the node 102 in which the component processing section 14 and the components 15 to 17 are operating, the processing section API 13 is operating. The control section API 12, which is the control section request issue section, and the processing section API 13, which is the processing section request issue section, are pieces of software which operate while communicating with each other. The control section API 12 behaves like the component processing section 14 and the components 15 to 17 toward the component control section 11, while the processing section API 13 behaves like the component control section 11 toward the component processing section 14 and the components 15 to 17.

The component control section 11 makes a request to the component processing section 14 or the components 15 to 17 by calling up the interface formed by the control section API 12. The control section API 12 receiving a request from the component control section 11 notifies the processing section API 13 of the request from the component control section 11 by data communication using the bus 103. At this time, data communication between the control section API 12 and the processing section API 13 is performed by using a data communication protocol defined in advance.

The processing section API 13 receives the request from the control section API 12 and converts the received request into a request to the component processing section 14 or the components 15 to 17 and issues the request to the component processing section 14 or the components 15 to 17.

When a notice of a result or a notice of an event from the component processing section 14 or the components 15 to 17 occurs, the processing section API 13 receives the notice and gives this notice to the control section API 12. The control section API 12 receives the notice from the processing section API 13 and gives this notice to the component control section 11.

The components 15 to 17 perform transmission and reception of data between the components 15 to 17 to perform processing for playing a moving image. The components 15 to 17 therefore have ports for performing transmission and reception of data.

As shown in FIG. 2, the component 15 has three ports 21a to 21c; the component 16 has four ports 22a to 22d; and the component 17 has two ports 23a and 23b. When connections are set between the ports 21a to 21c held by the component 15 and the ports held by one of the other components 16 and 17, data transfer is realized between the ports.

In the example shown in FIG. 2, connections are respectively set between the ports 21b and 21c held by the component 15 and the ports 22a and 22b held by the component 16. The multimedia processing control apparatus 1 performs data transfer between the component 15 and the component 16 by using these ports 21b and 22a or 21c and 22b. Similarly, connections are respectively set between the ports 22c and 22d held by the component 16 and the ports 23a and 23b held by the component 17. The multimedia processing control apparatus 1 performs data transfer between the component 16 and the component 17 by using these ports 22c and 23a or 22d and 23b.

The component control section 11 can set a connection to each of the ports of the components 15 to 17. In the example shown in FIG. 2, a connection is set between the component control section 11 and the port 21a held by the component 15, thereby enabling data transfer between the component control section 11 and the component 15.

The components 15 to 17 respectively hold buffers 24 to 26. The above-described port connection enables data sharing between the component control section 11 and one of the components 15 to 17 connected to each other or between two of the components 15 to 17 by using the corresponding one of the buffers 24 to 26. In the example shown in FIG. 2, data in the buffer 24 is shared between the component control section 11 and the component 15. In this case, the component control section 11 can control data stored in the buffer 24. Similarly, data in the buffer 25 is shared between the components 15 and 16 and data in the buffer 26 is shared between the components 16 and 17.

The component control section 11 issues a request command for generation and disposition of the components 15 to 17 according to a function to be realized to the component processing section 14 through the control section API 12 and the processing section API 13 to generate the components 15 to 17 and to set in advance the connections between the ports held by the generated components 15 to 17. The component control section 11 then issues, for example, a request command for playing a moving image to the component processing section 14 through the control section API 12 and the processing section API 13 to control the generated components 15 to 17 so that the moving image is played.

Processing at the time of generation and control of the components 15 to 17 will be described in detail.

Processing at the time of generation of the components 15 to 17 will first be described.

The component control section 11 makes a request of the control section API 12 for generation of components according to a function to be realized. It is assumed here that the component control section 11 has issued a request for generation of the components 15 to 17 in order to play a moving image.

The control section API 12 converts the request from the component control section 11 into data packets and sends a notice to the processing section API 13 through the bus 103.

The processing section API 13 calls up the component processing section 14 according to the request from the control section API 12.

The component processing section 14 generates instances of the components 15 to 17 according to the request from the processing section API 13. The instances of the components 15 to 17 include groups of information for management of the components 15 to 17 and identifiers for the components 15 to 17. The groups of information for management of the components 15 to 17 include names of the components 15 to 17, the conditions of the components 15 to 17, the number of ports and the conditions of the ports. The identifiers for the components 15 to 17 are pointers to the groups of information for management of the components 15 to 17 in the address space for the node 102. That is, these pointers respectively designate the heads of the addresses at which the groups of information for management of the components 15 to 17 are stored.

The component processing section 14 stores in the RAM 123 the instances of the components 15 to 17, i.e., the management information and the identifiers for the components 15 to 17 in this description. Also, the component processing section 14 notifies the processing section API 13 of execution results, the management information and the identifiers for the components 15 to 17 in the node 102. The processing section API 13 notifies the control section API 12 of the execution results, the management information and the identifiers for the components 15 to 17 in the node 102 through the bus 103.

The control section API 12 generates identifiers for the components 15 to 17 in the node 101 respectively corresponding to the identifiers for the components 15 to 17 in the node 102. The control section API 12 returns the generated identifiers for the components 15 to 17 in the node 101 to the component control section 11. Also, the control section API 12 holds and manages component information in which the identifiers for the components 15 to 17 in the node 101 and the management information and the identifiers for the components 15 to 17 in the node 102 are associated with each other. The control section API 12 stores in the RAM 113 this component information as a table shown in FIG. 3 and described below, and holds and manages this component information.

Processing for control of the components 15 to 17 thus generated will next be described.

The component control section 11 makes a request of the control section API 12 to set parameters to the components 15 17 or to make state transitions in the components 15 to 17. As parameter setting, setting of, for example, the format of data to be decoded and the size of an image to be output is performed. As state transitions in the components 15 to 17, transitions to securing of a memory and execution of processing for example are made.

The control section API 12 converts the request from the component control section 11 into data packets and sends a notice to the processing section API 13 through the bus 103. The control section API 12 converts the identifiers for the components 15 to 17 in the node 101 respectively into the identifiers for the components 15 to 17 in the node 102 and notifies the processing section API 13 of the converted identifiers for the components 15 to 17 in the node 102. This conversion is made by using a table shown in FIG. 3 and described below, i.e., a table held and managed by the control section API 12 at the time of generation of the components 15 to 17.

The processing section API 13 calls up the component processing section 14 according to the command from the control section API 12.

The component processing section 14 accesses data structures showing the information for management of the components 15 to 17 in the node 102 on the basis of the identifiers for the components 15 to 17 in the node 102, and issues processing requests to the components 15 to 17. The component processing section 14 notifies the processing section API 13 of processing results and output data. The processing section API 13 notifies the control section API 12 of the processing results and the output data through the bus 103.

The control section API 12 notifies the component control section 11 of the processing results and the output data. The component control section 11 repeatedly issues a request such as that described above to perform predetermined data processing, i.e., processing for playing a moving image in this description.

Figure 3:
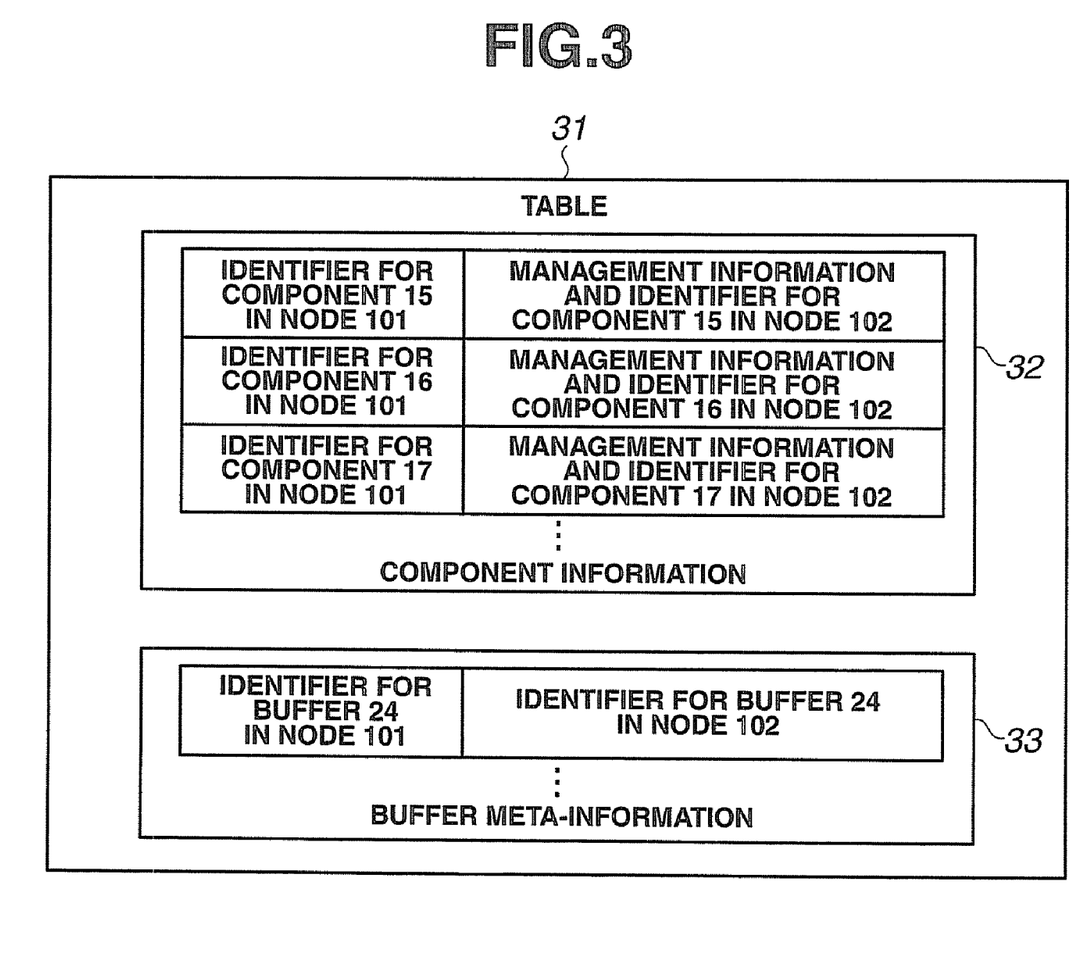
FIG. 3 is a diagram showing an example of a table held and managed by a control section API 12.

The table held and managed by the control section API 12 will be described. FIG. 3 is a diagram showing an example of the table held and managed by the control section API 12.

As shown in FIG. 3, a table 31 as the holding section held and managed by the control section API 12 contains two sorts of information: component information 32 and buffer meta-information 33.

In the component information 32, the identifiers for the components 15 to 17 in the node 101 and the management information and the identifiers for the components 15 to 17 in the node 102 are associated with each other. In the buffer meta-information 33, an identifier for the buffer 24 in the node 101 and an identifier for the buffer 24 in the node 102 are associated with each other.

As described above, when the component control section 11 makes a request of the component processing section 14 to generate the components 15 to 17, the component processing section 14 generates instances of the components 15 to 17, i.e., management information and identifiers in this description. The component processing section 14 holds and manages the management information and the identifiers for the components 15 to 17 on the RAM 123. However, the address space in the RAM 123 in the node 102 in which the component processing section 14 exists is different from the address space in the RAM 113 for the component control section 11. Therefore, the component control section 11 cannot control the components 15 to 17 by using the management information and the identifiers for the components 15 to 17 held by the component processing section 14.

The component processing section 14 then notifies the control section API 12 of the management information and the identifiers for the components 15 to 17 in the node 102 through the processing section API 13. The control section API 12 generates identifiers for the components 15 to 17 in the node 101 respectively corresponding to the management information and the identifiers for the components 15 to 17 in the node 102 and holds the generated identifiers as the table 31. Further, the identifiers for the components 15 to 17 in the node 101 are returned to the component control section 11.

Control of the components 15 to 17 is performed by using addresses which are the identifiers for the components 15 to 17 in the node 101 between the component control section 11 and the control section API 12. When the component control section 11 makes a processing request of the components 15 to 17, the control section API 12 searches the managed component information 32, i.e., the table 31, to identify the components 15 to 17 to which the component control section 11 should issue the request. Thereafter, the control section API 12 converts the identifiers for the components 15 to 17 in the node 101 issued from the component control section 11 into identifiers for the components 15 to 17 in the node 102 managed by the component processing section 14, delivers the converted identifiers to the processing section API 13, and issues the processing request.

Referring to FIG. 2, data is shared between the component control section 11 and the component 15 by using the buffer 24. However, the address space in the RAM 123 for the node 102 in which the component processing section 14 exists is different from the address space in the RAM 113 for the component control section 11. Therefore, the component control section 11 cannot control the buffer 24 by using the identifier for the buffer 24 held by the component processing section 14. The control section API 12 then generates identifier for the buffer 24 in the node 101 corresponding one-to-one to the identifier for the buffer 24 in the node 102, and returns the generated identifier for the buffer 24 in the node 101 to the component control section 11. Further, the control section API 12 associates the identifier for the buffer 24 in the node 101 and the identifier for the buffer 24 in the node 102 with each other and holds the identifiers as buffer meta-information 33 in the table 31.

When controlling the buffer 24, the component control section 11 notifies the control section API 12 of the identifier for the buffer 24 in the node 101. The control section API 12 converts the identifier for the buffer 24 in the node 101 into the identifier for the buffer 24 in the node 102 by referring to the buffer meta-information 33 in the table 31 and notifies the processing section API 13 of this identifier, thereby enabling sharing of data using the buffer 24 between the component control section 11 and the component 15.

In the present embodiment, the buffer 25 is shared between the components 15 and 16 and the buffer 26 is shared between the components 16 and 17. It is, therefore, not necessary for the control section API 12 to manage the buffer meta-information 33 about the buffers 25 and 26. In the buffer meta-information 33 in the table 31 shown in FIG. 3, the identifier for the buffer 24 in the node 101 and the identifier for the buffer 24 in the node 102 are associated with each other. If the buffer 25 is shared between the component control section 11 and the component 16, the control section API 12 associates an identifier for the buffer 25 in the node 101 and an identifier for the buffer 25 in the node 102 with each other and adds the identifiers as buffer meta-information 33 to the table 31.

The description has been made by assuming that the control section API 12 holds and manages component information 32 and buffer meta-information 33 as the table 31. However, the processing section API 13 may hold and manage the table 31 in place of the control section API 12.

The operation of the multimedia processing control apparatus 1 thus configured will be described.

Figure 4:
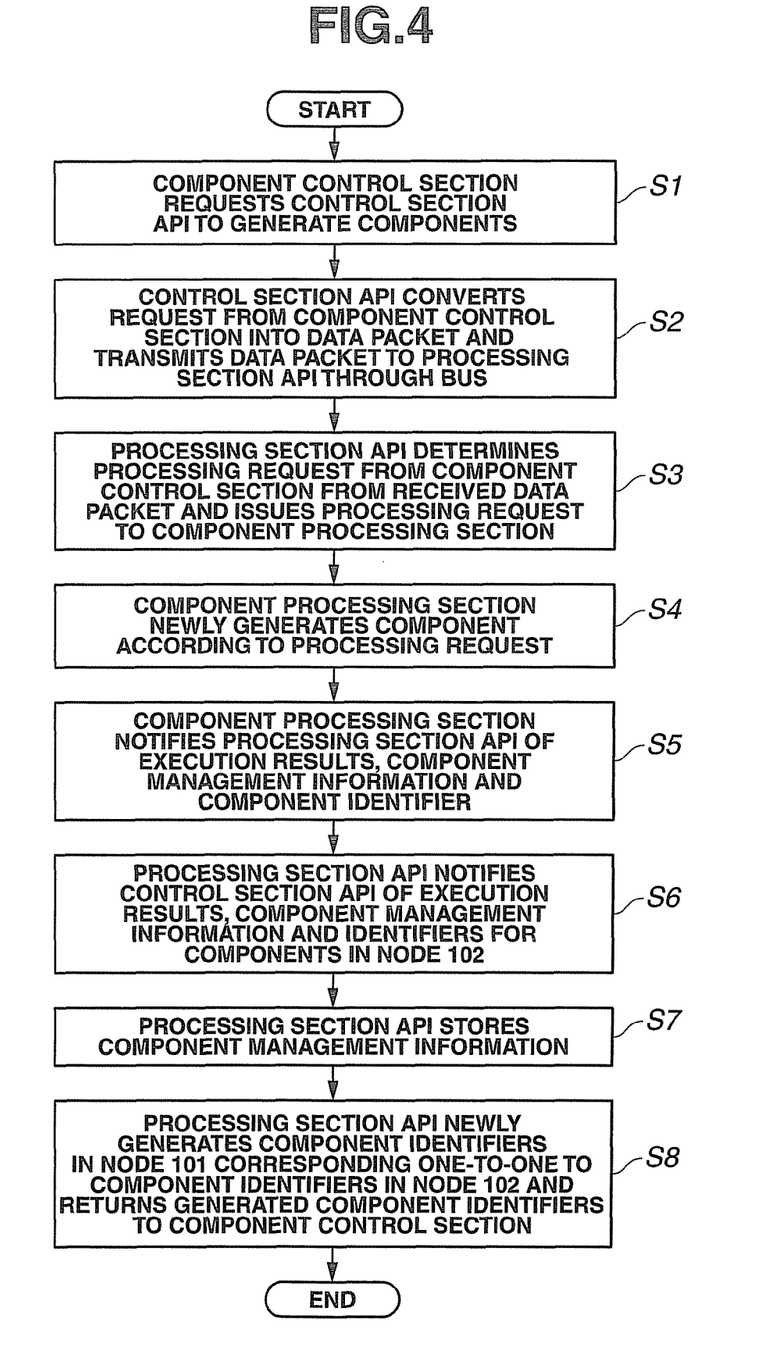
FIG. 4 is a flowchart showing an example of the flow of processing at the time of generation of components.

FIG. 4 is a flowchart showing the flow of processing at the time of component generation.

First, the component control section 11 makes a request of the control section API 12 for generation of the components 15 to 17 (step S1). The control section API 12 converts the request from the component control section 11 into data packets and transmits the data packets to the processing section API 13 through the bus 103 (step S2). The processing section API 13 determines the request from the component control section 11 from the received data packets and issues a processing request to the component processing section 14 (step S3). The component processing section 14 newly generates the components 15 to 17 according to the issued processing request (step S4). The component processing section 14 notifies the processing section API 13 of execution results, information for management of the components 15 to 17 and identifiers for the components 15 to 17 (step S5). The processing section API 13 notifies the control section API 12 of the execution results, the information for management of the components 15 to 17 and the identifiers for the components 15 to 17 in the node 102 (step S6). The control section API 12 stores the information for management of the components (step S7). The control section API 12 newly generates identifiers for the components 15 to 17 in the node 101 corresponding one-to-one to the identifiers for the components 15 to 17 in the node 102, and returns the newly generated identifiers for the components 15 to 17 in the node 101 to the component control section 11 (step S8). The identifiers for the components 15 to 17 in the node 101 are pointers to the information for management of the components 15 to 17 stored in step S7.

Figure 5:
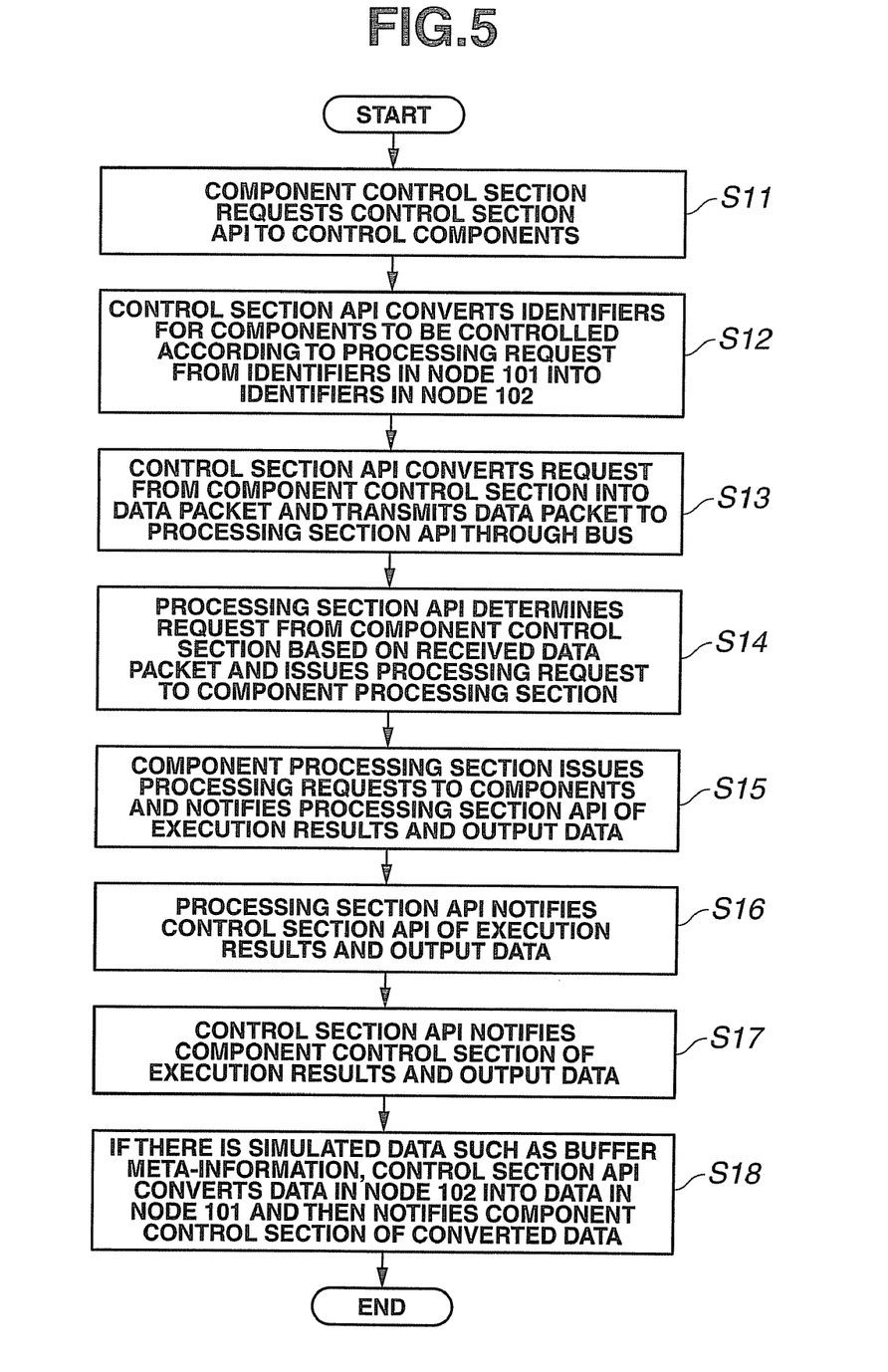
FIG. 5 is a flowchart showing an example of the flow of processing at the time of control of components.

FIG. 5 is a flowchart showing the flow of processing at the time of component control.

First, the component control section 11 makes a request of the control section API 12 for control of the components 15 to 17 (step S11). To designate, at the time of issue of the request, the components 15 to 17 to be operated at the request, the component control section 11 designates the identifiers for the components 15 to 17 in the node 101. The control section API 12 converts the identifiers for the components 15 to 17 to be operated at a processing request from the identifiers in the node 101 to the identifiers in the node 102 (step S12). The control section API 12 then converts the request from the component control section 11 into data packets and transmits the data packets to the processing section API 13 through the bus 103 (step S13). The processing section API 13 determines the request from the component control section 11 from the received data packets and issues processing requests to the component processing section 14 (step S14). The component processing section 14 issues processing requests to the components 15 to 17, and notifies the processing section API 13 of execution results and output data (step S15). The processing section API 13 notifies the control section API 12 of the execution results and the output data (step S16). The control section API 12 notifies the component control section 11 of the execution results and the output data (step S17). If there is simulated data such as buffer meta-information, the control section API 12 converts data in the node 102 into data in the node 101 and notifies the component control section 11 of the converted data (step S18).

As described above, the control section API 12 converts a request from the component control section 11 into data and notifies the processing section API 13 of the converted data. The processing section API 13 notifies the control section API 12 of management information and identifiers for generated components 15 to 17 in the node 102. The control section API 12 generates identifiers in the node 101 corresponding to the identifiers for the components 15 to 17 in the node 102 and notifies the component control section 11 of the generated identifiers. In consequence, when the component control section 11 sends a request to the control section API 12 by using the identifiers for the components 15 to 17 in the node 101 at the time of controlling the components 15 to 17 existing in the different address space, the control section API 12 converts the identifiers for the components 15 to 17 in the node 101 into the identifiers for the components 15 to 17 in the node 102. The converted identifiers for the components 15 to 17 in the node 102 are supplied to the component processing section 14 through the processing section API 13 to enable the component processing section 14 to control the components 15 to 17 by designating the corresponding information for management of the components 15 to 17 on the basis of the identifiers for the components 15 to 17 in the node 102.

Thus, in the multimedia processing control apparatus according to the present embodiment, the component control section can control components even in a case where the address space in which the component control section exists is different from the address space in which the components exist.

(Second Embodiment)

A second embodiment of the present invention will be described. In a conventional remote system in which the address space for a component control section and the address space for components are different from each other, the components cannot be shared by a plurality of component control sections. The multimedia processing control apparatus in the present embodiment is configured so that even in a case where a component control section exists in each of a plurality of nodes, the component control sections in the plurality of nodes can control components and can also share generated instances of the components.

Figure 6:
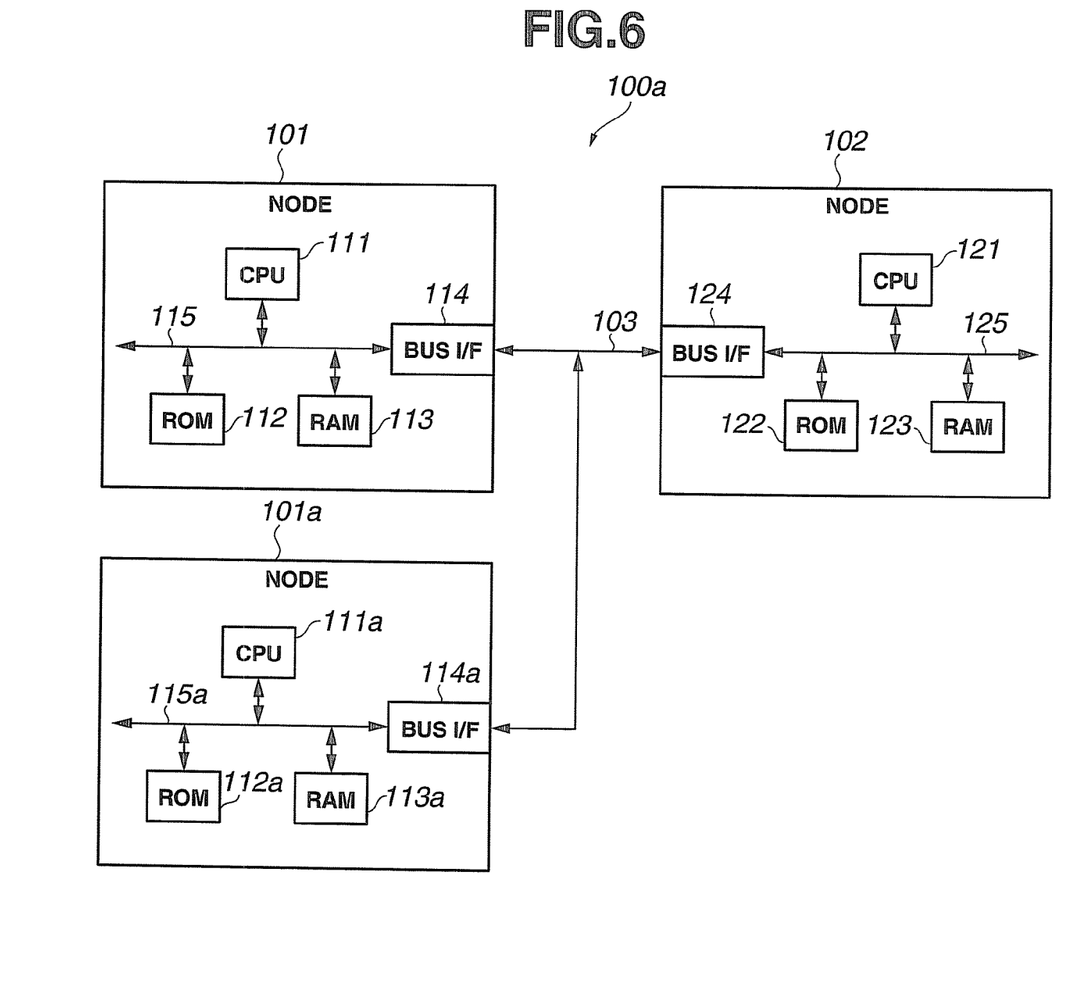
FIG. 6 is a diagram showing the configuration of a multimedia processing control system according to a second embodiment of the present invention.

FIG. 6 is a diagram showing the configuration of a multimedia processing control system according to the second embodiment of the present invention. In FIG. 6, the same components as those in FIG. 1 are indicated by the same reference characters. The description of the same components will not be repeated.

As shown in FIG. 6, a multimedia processing control system 100*a* includes a node 101*a* in addition to the node 101, the node 102 and the bus 103 shown in FIG. 1. The node 101, the node 101*a* and the node 102 are connected to each other by the bus 103.

The node 101*a* has the same configuration as that of the node 101. The node 101*a* includes a CPU 111*a*, a ROM 112*a*, a RAM 113*a*, a bus I/F 114*a* and a local bus 115*a*. The CPU 111*a*, the ROM 112*a*, the RAM 113*a* and the bus I/F 114*a* are connected to each other by the local bus 115*a*.

A component control program and a control section API are stored in the ROM 112*a*, as in the ROM 112. The CPU 111*a* reads out these programs from the ROM 112*a*, loads the programs into the RAM 113*a* and executes the programs.

The node 101*a* controls components 15 to 17 in the node 102 through the bus 103. That is, in the multimedia processing control system 100*a*, the two component control sections can share the components 15 to 17.

The multimedia processing control system 100*a*, configured by having two nodes 101 and 101*a*, may alternatively be configured by having three or more nodes. That is, the multimedia processing control system 100*a* may be configured so that three or more component control sections share components 15 to 17.

Figure 7:
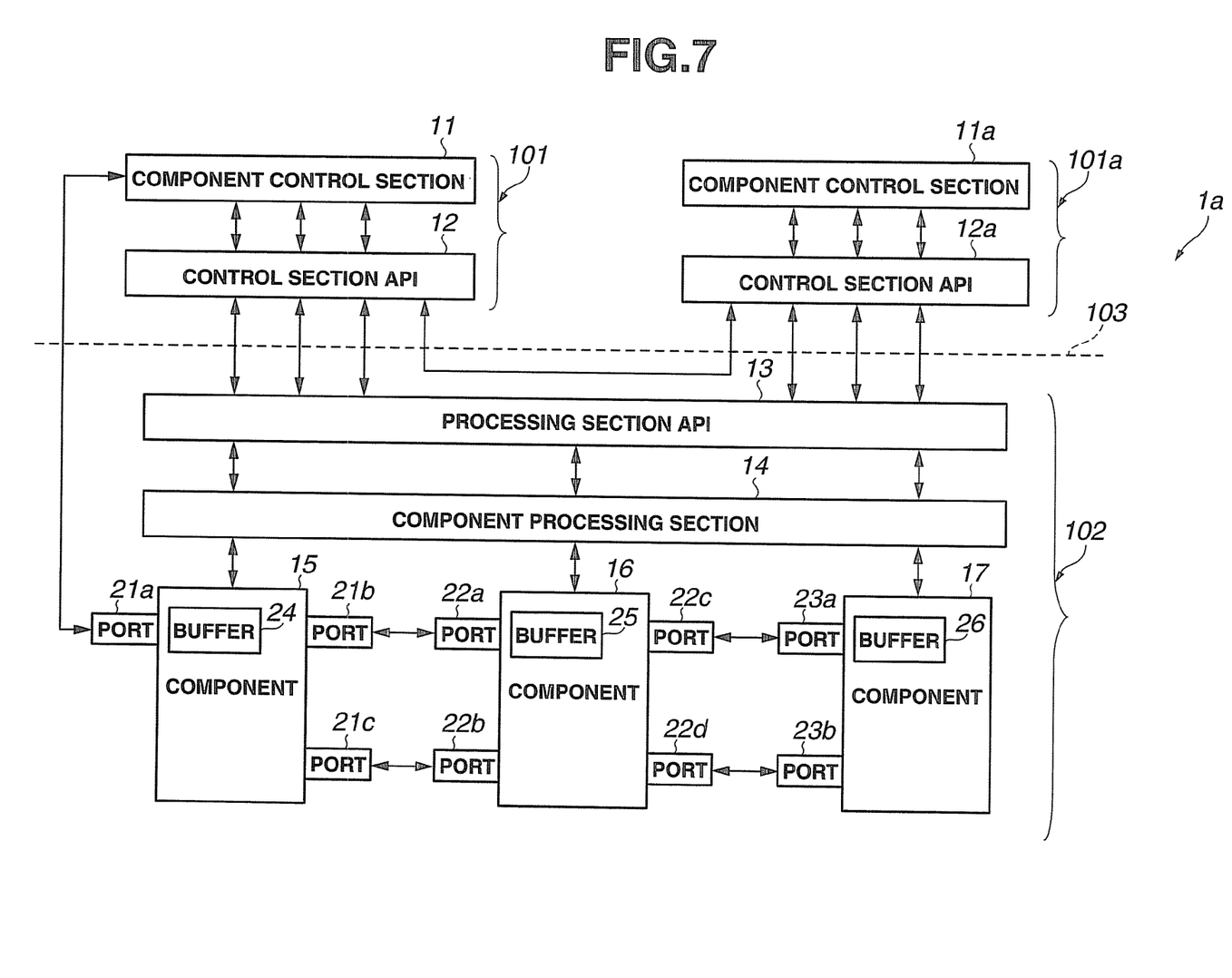
FIG. 7 is a diagram showing the configuration of a multimedia processing control apparatus according to the second embodiment of the present invention.

FIG. 7 is a diagram showing the configuration of a multimedia processing control apparatus according to the second embodiment. In FIG. 7, the same components as those in FIG. 2 are indicated by the same reference characters. The description of the same components will not be repeated.

As shown in FIG. 7, a multimedia processing control apparatus 1*a* is configured by adding a component control section 11*a* and a control section API 12*a* to the multimedia processing control apparatus 1 shown in FIG. 2.

When issuing a request to newly generate a component 15, 16, or 17, the component control section 11*a* in the node 101*a* determines whether or not any instance sharing setting has been made with respect to the component 15, 16, or 17 scheduled to be generated. If an instance sharing setting has been made, the component control section 11*a* inquires of any other node, the node 101 in this description whether there is any instance of the same component 15, 16, or 17 as the component 15, 16, or 17 scheduled to be generated. That is, when generating, for example, the component 15, the component control section 11*a* inquires of the node 101 whether there is any instance of the component 15. In other words, the component control section 11a makes an inquiry about whether or not the component control section 11 in the node 101 has generated the component 15. In a case there is an instance of the component 15 in the node 101, that is, the component control section 11 has generated the component 15, the component control section 11a shares the management information and the identifier for the component 15 without generating the component 15. Accordingly, the control section API 12a holds and manages sharing information and reference destination address information described below and returns the identifier for the component 15 in the node 101a to the component control section 11a. The control section API 12a performs the same processing with respect to each of the components 16 and 17.

On the other hand, in a case where no instance sharing setting has been made with respect to the component 15, 16, or 17 scheduled to be generated, the component control section 11a executes the above-described generation processing shown in FIG. 4. Similarly, also in a case where no instance of the component 15, 16, or 17 scheduled to be generated has been generated by the component control section 11, the component control section 11a executes the above-described generation processing shown in FIG. 4.

Figure 8:
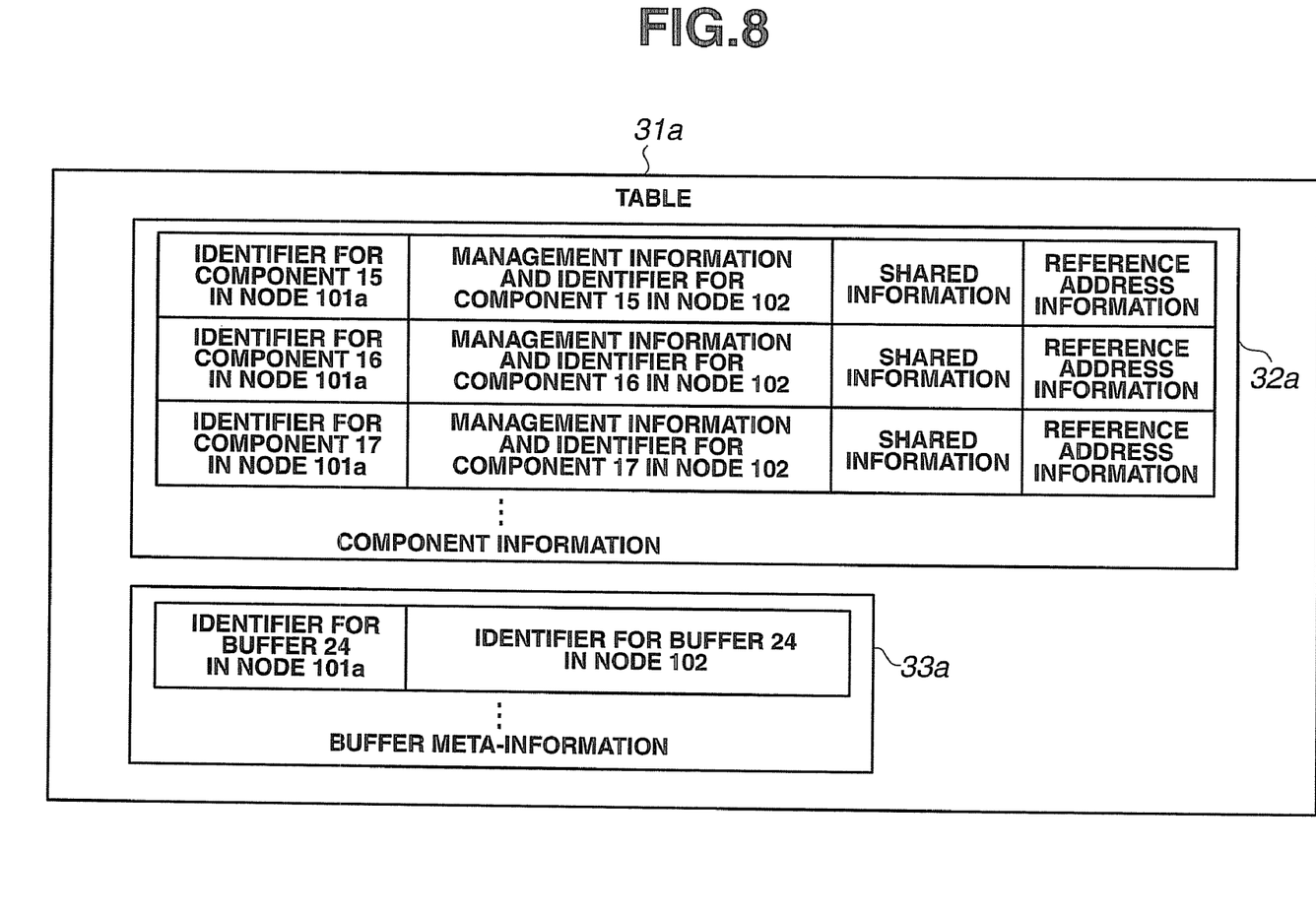

A table managed and held by the control section API 12a will be described. The control section API 12 also holds and manages a similar table. FIG. 8 is a diagram showing an example of the table held and managed by the control section API 12a.

As shown in FIG. 8, a table 31a managed by the control section API 12a has component information 32a and buffer meta-information 33a. The component information 32a is formed by adding sharing information and reference destination address information about the components 15 to 17 to the component information 32 shown in FIG. 3.

As sharing information, information as to whether or not there is any instance of the component 15 in any other node, the node 101 in this description is stored. As reference destination address information, if there is the sharing information, information on the addresses of the management information and the identifier for the component 15 in the node 102 held by the node 101 is stored.

When controlling the components 15 to 17, the component control section 11a outputs identifiers for the components 15 to 17 in the node 101a to the control section API 12a. If information indicating the existence of an instance of one of the components 15 to 17 in the different node 101 exists in the sharing information about the components 15 to 17, the control section API 12a refers to the reference destination address information about the one of the components 15 to 17. The control section API 12a controls the components 15 to 17 while referring to the management information and the identifier for the one of the components 15 to 17 in the node 102 managed by the node 101 on the basis of the reference destination address information about the one of the components 15 to 17.

As described above, the control section API 12a holds, as component information 32a, sharing information and reference destination addresses as well as the identifiers for the components 15 to 17 in the node 101a, the management information and the identifiers for the components 15 to 17 in the node 102. The plurality of component control sections 11 and 11a connected by the bus 103 and existing in different address spaces are thereby enabled to share and control through the bus 103 the components 15 to 17 existing in different address spaces.

In the multimedia processing control apparatus la according to the present embodiment, even in a case where a component control section exists in each of a plurality of nodes, the component control sections in the plurality of nodes can control components and can also share generated instances of the components.

"Sections" referred to in the present specification are conceptual components which correspond to certain functions in the embodiments, and which do not necessarily correspond one-to-one to concrete pieces of hardware or software routines. In the present specification, therefore, the embodiments have been described with reference to virtual circuit blocks (sections) assumed to have the functions according to the embodiments. The steps in the flowcharts referred to in the present specification may be rearranged into any other sequence, e.g., one formed by changing the execution order, one in which two or more of the steps are executed simultaneously with each other, or one in which the execution order is changed in every execution, provided that their essential characters are maintained.

The whole or part of the program for execution of the above-described operation is recorded or stored as a computer program product on a movable medium such as a flexible disk or a CD-ROM, or a storage medium such as a hard disk. The program code of the program is read with a computer to execute the entire operation or part of the operation. Alternatively, the whole or part of the program code can be distributed or provided through a communication network. A user can easily implement the multimedia processing control apparatus of the present invention by downloading the computer program through a communication network and installing the program in a computer, or by installing the program in a computer from a recording medium.

The present invention is not limited to the above-described embodiments. Various changes and modifications can be made in the described embodiments without departing from the gist of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A multimedia processing control apparatus comprising:
a holding section configured to hold groups of information for management of a plurality of components generated in a first address space and each configured to execute predetermined processing, and a plurality of groups of first address information respectively designating the groups of information for management of the plurality of components, and to hold, in a second address space in which a component control section configured to control the plurality of components exists, a plurality of groups of second address information respectively corresponding to the plurality of groups of first address information;
a control section request issue section configured to convert, when a processing request is issued from the component control section, the plurality of groups of second address information in the second address space designated by the component control section into the plurality of groups of first address information in the first address space by referring to the holding section, and to issue the processing request;

a processing section request issue section configured to issue from the first address space the processing request from the component control section issued from the control section request issue section; and a component processing section configured to control the plurality of components on the basis of the plurality of groups of first address information in the first address space of the processing request issued from the processing section request issue section.

2. The multimedia processing control apparatus according to claim 1, wherein the holding section holds third address information in the first address space about buffers shared between the component control section and the plurality of components, and holds, in the second address space, fourth address information corresponding to the third address information; and wherein when the processing request is issued, the control section request issue section converts the fourth address information in the second address space designated by the component control section into the plurality of groups of third address information in the first address space by referring to the holding section, and issues the processing request to the processing section request issue section.

3. The multimedia processing control apparatus according to claim 1, wherein when a notice of a processing result and processed data occurs from the plurality of components or the component processing section in response to the processing request, the processing section request issue section notifies the control section request issue section of the processing result and the processed data.

4. The multimedia processing control apparatus according to claim 3, wherein each of the plurality of components has a plurality of ports for performing transmission and reception of the processing results and the processed data between the plurality of components.

5. The multimedia processing control apparatus according to claim 4, wherein connections to the plurality of ports held by each of the plurality of components are set by the component control section.

6. The multimedia processing control apparatus according to claim 4, wherein each of the groups of information for management of the plurality of components includes a name and a state of the corresponding one of the plurality of components, the number of ports of the corresponding one of the plurality of components, and the states of the ports.

7. The multimedia processing control apparatus according to claim 3, wherein the control section request issue section and the processing section request issue section perform data communication therebetween and perform issue of the processing request, notification of the processing results and notification of the processed data.

8. The multimedia processing control apparatus according to claim 7, wherein the data communication is performed by using a data communication protocol defined in advance.

9. The multimedia processing control apparatus according to claim 1, further comprising a plurality of groups of sections each formed of the control section request issue section and the corresponding component control section existing respectively in different address spaces, wherein when one of the plurality of component control sections issues a request for generation of an instance of the plurality of components, the corresponding one of the plurality of control section request issue sections determines whether or not sharing of the instance has been set, and, if the sharing has been set, inquires of the plurality of control section request issue sections existing in the different address spaces whether or not the same instance as the instance to be generated according to the request exists, and, if the same instance exists, shares the groups of information for management of the plurality of components and the plurality of groups of first address information designating the groups of information for management of the plurality of components without performing generation of the instance.

10. The multimedia processing control apparatus according to claim 1, wherein the plurality of components include functional blocks configured to execute at least video decoding processing, filtering processing and output processing.

11. A multimedia processing control method comprising:

holding, by a holding section, groups of information for management of a plurality of components generated in a first address space and each configured to execute predetermined processing, and a plurality of groups of first address information respectively designating the groups of information for management of the plurality of components, and also holding, by the holding section, in a second address space in which a component control section configured to control the plurality of components exists, a plurality of groups of second address information respectively corresponding to the plurality of groups of first address information;

converting, by a control section request issue section, when a processing request is issued from the component control section, the plurality of groups of second address information in the second address space designated by the component control section into the plurality of groups of first address information in the first address space by referring to the holding section, and issuing the processing request by the control section request issue section;

issuing, by a processing section request issue section, from the first address space, the processing request from the component control section issued from the control section request issue section; and controlling, by a component processing section, the plurality of components on the basis of the plurality of groups of first address information in the first address space of the processing request issued from the processing section request issue section.

12. The multimedia processing control method according to claim 11, wherein the holding section holds third address information in the first address space about buffers shared between the component control section and the plurality of components, and holds, in the second address space, fourth address information corresponding to the third address information; and wherein when the processing request is issued, the control section request issue section converts the fourth address information in the second address space designated by the component control section into the plurality of groups of third address information in the first address space by referring to the holding section, and issues the processing request to the processing section request issue section.

13. The multimedia processing control method according to claim 11, wherein when a notice of a processing result and processed data occurs from the plurality of components or the component processing section in response to the processing request, the processing section request issue section notifies the control section request issue section of the processing result and the processed data.

14. The multimedia processing control method according to claim 13, wherein each of the plurality of components has a plurality of ports for performing transmission and reception of the processing results and the processing data between the plurality of components.

15. The multimedia processing control method according to claim 14, wherein connections to the plurality of ports held by each of the plurality of components are set by the component control section.

16. The multimedia processing control method according to claim 14, wherein each of the groups of information for management of the plurality of components includes a name and a state of the corresponding one of the plurality of components, the number of ports of the corresponding one of the plurality of components, and the states of the ports.

17. The multimedia processing control method according to claim 13, wherein the control section request issue section and the processing section request issue section perform data communication therebetween and perform issue of the processing request, notification of the processing results and notification of the processed data.

18. The multimedia processing control method according to claim 17, wherein the data communication is performed by using a data communication protocol defined in advance.

19. The multimedia processing control method according to claim 11, wherein a plurality of groups of sections each faulted of the control section request issue section and the corresponding component control section are respectively provided in different address spaces; and wherein when one of the plurality of component control sections issues a request for generation of an instance of the plurality of components, the corresponding one of the plurality of control section request issue sections determines whether or not sharing of the instance has been set, and, if the sharing has been set, inquires of the plurality of control section request issue sections existing in the different address spaces whether or not the same instance as the instance to be generated according to the request exists, and, if the same instance exists, shares the groups of information for management of the plurality of components and the plurality of groups of first address information designating the groups of information for management of the plurality of components without performing generation of the instance.

20. The multimedia processing control method according to claim 11, wherein the plurality of components include functional blocks configured to execute at least video decoding processing, filtering processing and output processing.

* * * * *